US006607775B2

(12) United States Patent
Aldred et al.

(10) Patent No.: US 6,607,775 B2
(45) Date of Patent: *Aug. 19, 2003

(54) FROZEN LOW-FAT FOOD EMULSIONS

(75) Inventors: Alex Aldred, Bedford (GB); Ingrid Anne Appelqvist, Bedford (GB); Charles Rupert Brown, Bedford (GB); Jennifer Elizabeth Homan, Bedford (GB); Malcolm Glyn Jones, Bedford (GB); Mark Emmett Malone, Bedford (GB); Ian Timothy Norton, Bedford (GB); Jeffrey Underdown, Bedford (GB)

(73) Assignee: Good Humor-Breyers Ice Cream, division of Conopco, Inc., Green Bay, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,906

(22) Filed: Jul. 26, 1999

(65) Prior Publication Data

US 2003/0099751 A1 May 29, 2003

(30) Foreign Application Priority Data

Aug. 6, 1998 (GB) ............................................. 9817183

(51) Int. Cl.[7] ................................................. A23G 9/00
(52) U.S. Cl. ....................... 426/565; 426/103; 426/578; 426/650
(58) Field of Search .......................... 426/98, 103, 565, 426/650, 534, 101, 586, 578

(56) References Cited

U.S. PATENT DOCUMENTS

| 4,012,533 A | * | 3/1977 | Jonas |
| 4,031,261 A | * | 6/1977 | Durst |
| 4,853,243 A | * | 8/1989 | Kahn et al. |
| 4,855,156 A | * | 8/1989 | Singer et al. ................ 426/565 |
| 5,080,921 A | * | 1/1992 | Reimer |
| 5,082,684 A | * | 1/1992 | Fung ........................... 426/602 |

(List continued on next page.)

FOREIGN PATENT DOCUMENTS

| EP | 815 743 | | 1/1998 |
| GB | 2008382 | | 6/1979 |
| GB | 2086835 | * | 5/1982 |
| JP | 63-023736 | * | 2/1988 |
| JP | 3-285654 | * | 12/1991 |
| JP | 9-110663 | * | 4/1997 |
| JP | 11-155480 | * | 6/1999 |
| WO | WO 90/00354 | | 1/1990 |
| WO | WO 98/15191 | | 4/1998 |
| WO | 98/34501 | | 8/1998 |
| WO | WO 98/34501 | | 10/1998 |

OTHER PUBLICATIONS

Marshall and Arbuckle, "Ice Cream", fifth edition, pp. 18, 19, 203, 208, 251–253, 327 (1996).*

Primary Examiner—Nina Bhat
(74) Attorney, Agent, or Firm—Gerard J. McGowan, Jr.

(57) ABSTRACT

Frozen low-fat food emulsions comprise a continuous aqueous phase and a dispersed phase which comprises fat particles, gel particles and fat-soluble flavour molecules; substantially all of the fat particles are located within the gel particles, and at least 35% of the flavour molecules are located in a plurality of the gel particles. The rate of release of the flavour molecules from the frozen emulsion is delayed, thereby imparting the taste of a full-fat emulsion.

15 Claims, 11 Drawing Sheets

U.S. PATENT DOCUMENTS

| | | | |
|---|---|---|---|
| 5,158,798 A | * 10/1992 | Fung et al. | 426/602 |
| 5,192,569 A | * 3/1993 | McGinley et al. | |
| 5,250,306 A | 10/1993 | McCleary et al. | |
| 5,308,639 A | * 5/1994 | Fung | 426/602 |
| 5,332,595 A | 7/1994 | Gaonkar | |
| 5,456,937 A | 10/1995 | Chalups | 426/573 |
| 5,462,761 A | * 10/1995 | McGinley et al. | |
| 5,498,439 A | 3/1996 | Bonner | |
| 5,536,519 A | 7/1996 | Graf et al. | |
| 5,767,107 A | * 6/1998 | Chaundy et al. | |
| 5,942,266 A | * 8/1999 | Okamura et al. | |

* cited by examiner

4 = 12.8% Fat control

3 = 0.5% Fat control

2 = 0.5% Fat + empty beadlets

1 = 0.5% Fat microstructured emulsion

4 = 12.8% Fat control

3 = 0.5% Fat control

2 = 0.5% Fat + empty beadlets

1 = 0.5% Fat microstructured emulsion

4 = 12.8% Fat control

3 = 0.5% Fat control

2 = 0.5% Fat + empty beadlets

1 = 0.5% Fat microstructured emulsion

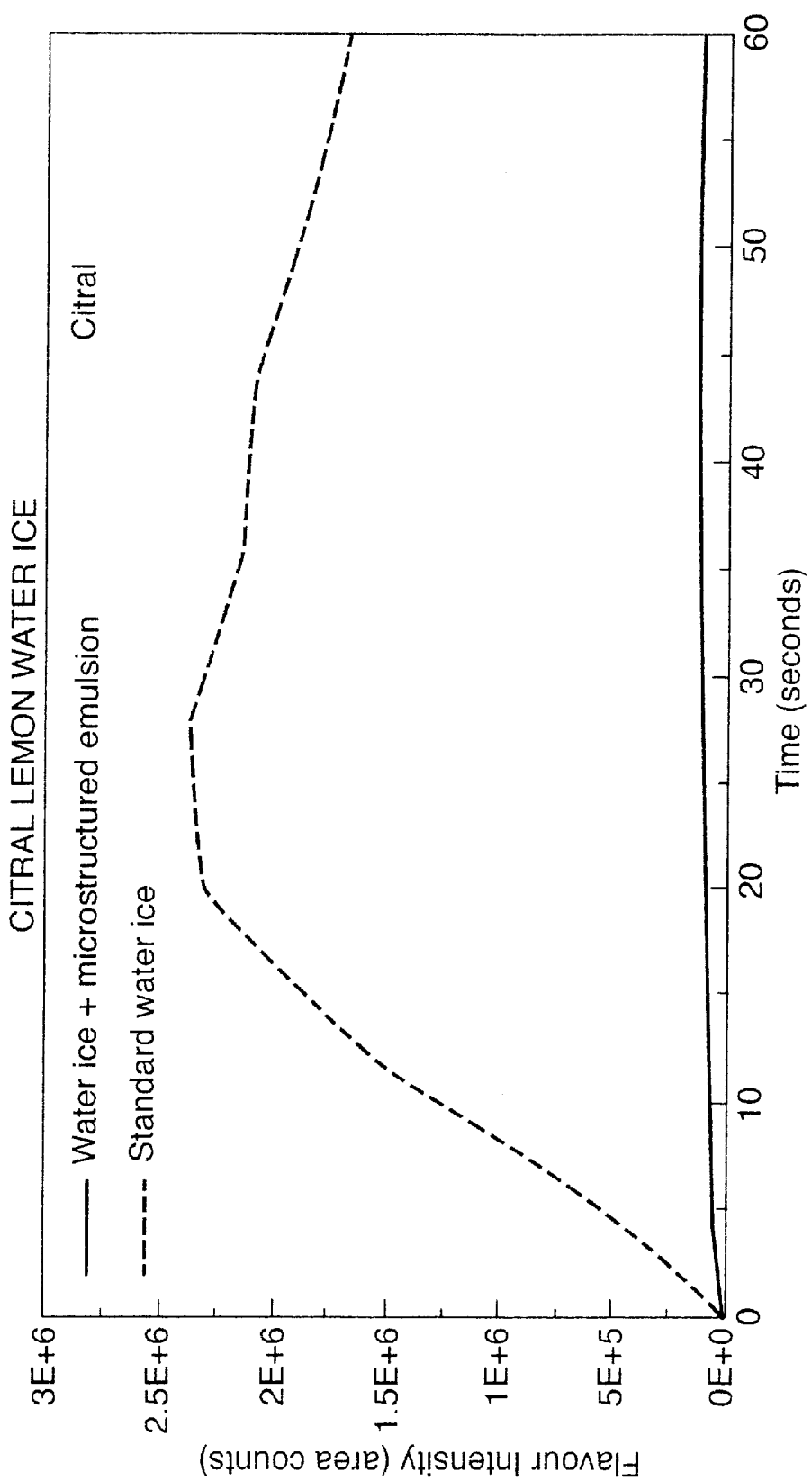

FROZEN LOW-FAT FOOD EMULSIONS

The present invention relates to frozen low-fat food emulsions, particularly to low-fat oil-in-water emulsions, and to processes for preparing these emulsions.

Although an increasing number of consumers prefer low-fat food products over full fat food products, it is difficult for manufacturers of low-fat products to replicate the desired flavour of full-fat products. This difficulty is particularly a problem in frozen low-fat food products such as ice-creams, and other low-fat food products.

It has been demonstrated that lowering the fat content of foods gives rise to flavour imbalance, as the rate of flavour release is greater in fat-reduced foods; in this respect, reference is made to an article by Shamil et al in Food Quality and Preference 1991/2, 3 (1) 51–60 entitled "Flavour release and perception in reduced-fat foods".

The greater rate of flavour release in reduced-fat frozen oil-in-water food emulsions is demonstrated by the present inventors in FIG. 1, which is a graph of profiles of flavour intensity against time for non-aerated ice-creams having different levels of fat (see in particular line 7 (0.5 wt % fat) and line-1 (12.8. wt % fat)).

During oral processing, full-fat (eg 12.8 wt % fat) ice-creams exhibit a gradual build up of flavour to a low peak of maximum flavour impact, followed by a slow dissipation of flavour. In contrast, traditional very low-fat/zero-fat (less than 3 wt % fat) ice-creams exhibit a rapid dissipation of flavour creating a very high peak of maximum flavour impact at an early stage of oral processing.

The same greater rate of flavour release in reduced-fat food products also occurs in the oral processing of full fat versus low fat non-frozen food emulsions, as is known from our co-pending application PCT/EP98/00645.

The profile exhibited by full-fat frozen products eg ice-creams equates to a taste and mouthfeel that are preferred by consumers; the profile exhibited by equivalent low-fat products equates to a flavour which is initially too intense, with no pleasing aftertaste.

Many important flavour molecules are lipophilic i.e. hydrophobic. As fat levels are reduced in oil-in-water emulsions, a greater proportion of these flavour molecules are found in the water phase. When the emulsion is broken down, eg in the mouth during eating, the hydrophobic nature of the flavour molecules results in their rapid release into nasal airspace.

Developments in flavour technology have resulted in flavour molecules being encapsulated to control flavour release and to stabilise and protect the molecules. Commonly-used encapsulation techniques include spray-drying, bed fluidisation and coacervation. (See the reference "Encapsulation and Controlled Release" by Karsa and Stephensen, Royal Soc Chem, ISBN 0.85/86-6/5-8.)

These techniques involve entrapping a flavour molecule within a covering or microcapsule. The resulting encapsulated product is often in the form of small dry particles, which are added to foodstuffs. Upon heating or eating the foodstuffs, the particles are thermally or physically broken down to release the flavour molecules. The release is normally rapid.

U.S. Pat. No. 5 498 439 discloses encapsulating flavour oils in a colloid gel, which is made from water and animal protein polymers or plant polysaccharides. The flavour oil is mixed with the gel components under high shear pressure to create a stable colloid gel matrix, in which the flavour oil is physically encapsulated and retained by the hydrophilic nature of the gel. A solution of the encapsulated flavour oil may be injected into meat to impart flavour thereto.

Our co-pending patent application PCT/EP98/00645 discloses non-frozen low-fat food emulsions having a rate of flavour release which is comparable to that of the equivalent full-fat non-frozen food emulsions. In particular it discloses a non-frozen low-fat food emulsion comprising a continuous aqueous phase and a dispersed phase which comprises fat particles, gel particles and fat-soluble flavour particles with the rate of release of the flavour molecules from the emulsion being delayed to provide a similar release rate to that of the corresponding full fat product.

The present invention seeks to provide a frozen low-fat food emulsion having a rate of flavour release which is comparable to that of a full-fat frozen food emulsion, thereby creating a frozen low-fat food emulsion having the flavour of a frozen full-fat food emulsion.

According to a first aspect of the present invention there is provided a frozen low-fat food emulsion comprising a continuous aqueous phase and a dispersed phase which comprises fat particles, gel particles and fat-soluble flavour molecules, wherein substantially all of the fat particles are located within the gel particles, and wherein at least 35% of the flavour molecules are located in a plurality of the gel particles to thereby delay the rate of release of the flavour molecules from the frozen emulsion.

It is preferred that at least 50% of the flavour molecules are located in a plurality of the gel particles, and most preferably at least 60% are so located.

The actual proportion of flavour molecules which are located in the gel particles will depend on the oil/water partition coefficient of the flavour molecules concerned. In the above, it is preferred that a plurality (i.e. more than 50%) of the flavour molecules are located in a plurality of the gel particles (which may be the case when the flavour molecule has a better solubility in oil than in water). The higher the percentage of the flavour molecules that is located in the gel particles, the better is the delayed release effect obtained.

For the purpose of the present invention, fat-soluble flavour molecules include flavour molecules which are totally soluble in fat or oil, and flavour molecules which are only partially soluble in fat or oil.

'Frozen' as used herein refers to emulsions that contain part of their composition as ice. The characteristic temperature at which ice forms is dependent on the amount of soluble components in the composition. Typically the temperature at which ice forms in the composition, or at which freezing occurs, is in the range of 0° C. to −5° C., but it may be lower, e.g. 5° C. to −20° C. if a high solids (especially sugar) content is used. The frozen emulsion is designed to be stored and/or consumed with an ice-phase present.

The frozen low-fat emulsions of the present invention have a continuous aqueous phase (which may be in a partially or fully frozen state in the frozen product) and a dispersed phase which comprises fat particles, gel particles and flavour molecules. Any food product that is frozen and has the above structure is encompassed by the term "frozen (low-fat) food emulsion" as used herein.

Also, it is herein to be understood that the present invention is limited (application in) to frozen emulsions. Examples include ice-creams, sherbet, frozen custards, frozen yoghurts, frozen mousses, and other conventionally fat containing frozen (emulsion) confections. A list of typical frozen food products is given in "Ice-cream", by Arbuckle 4th edition, Appendix B and E, published by Van Nostrand Reinhold Company. Also covered by "frozen emulsions" are frozen "microstructured emulsions". Furthermore within the term frozen-emulsions as used herein are encompassed frozen food products that are not conventionally produced as emulsions such as e.g. water ices, sorbets and frozen fruit purees, but which will be in the form of a frozen emulsion when produced in accordance with the invention.

It is to be understood that the term "frozen food emulsions" as used herein includes all such suitable emulsions. Also encompassed by the term "frozen emulsions" as used herein are water ices, sorbets and other conventionally fat free food products having a fat ingredient added thereto. In certain circumstances it may be desirable to include a fat-containing component in a water ice or sorbet, etc., for example to produce a 'creamy' or 'milky' texture, or to allow the introduction of fat-soluble flavours. In such cases, where fat is present in a conventionally fat free product, the water ice or sorbet, etc., falls within the scope of the present invention.

By the term 'low-fat' as used herein is meant those food emulsions as defined above that have a reduced total fat content when compared to the traditional full-fat version of that product. However, within this definition it is to be appreciated that the term 'low-fat' covers a wide range of possible fat contents, dependant upon the fat content of the full-fat product. Whilst ice-creams are used to exemplify the definition , it will be appreciated that for a higher fat content full fat product, e.g. Cream, the low-fat version may contain relatively high fat levels, e.g. 30 wt % fat. For example, traditional full fat ice-creams typically have a fat content in the range 5–16 wt %, whereas, a low-fat ice-cream typically has a fat content in the range 0–8% total fat.

For the term 'low fat' as used herein the restriction applies that for a given full fat formulation the fat content is reduced in the equivalent low-fat formulation. In other words, a full fat traditional ice-cream formulation containing 16 wt % total fat may be produced as a low fat variety containing 8 wt % fat, even though this wt % fat falls within the range that may be encountered for other full-fat ice-creams.

For products that do not always conventionally contain fat, e.g. water ices and sorbets etc., but for which it may be desirable to add fat in some certain circumstances (eg to provide a different fat-soluble flavour or to make a milk-ice), the term 'low-fat' as used herein applies to products containing less than 5 wt % fat.

The frozen low-fat food emulsions of the invention are the emulsions per se, e.g. a low-fat ice-cream. Furthermore, the frozen low-fat food emulsions of the invention may form part of any composite food product such as e.g. a coated ice-cream or an ice-cream filled wafer, etc. The whole, or just the emulsion part of the composite product may be frozen.

The frozen low-fat food emulsions, and composite products containing the emulsions, will typically comprise other conventional food product ingredients such as those selected from colourants, fruit pieces, nut pieces, sauces and couvertures etc., as appropriate.

The frozen low-fat food emulsions of the present invention may be either aerated or non-aerated emulsions as required. It is preferred that if the emulsion is an aerated ice-cream, in other words it has a % overrun of greater than 1%, it has an overrun in the range of 5–200% more preferably 10–150%, for example 15–140%, or e.g. 18–130%.

The gel particles are prepared from one or more food grade gel-forming biopolymers, preferably selected from proteins (eg casein) galactans (eg agar, carrageenans, furcelleran), galactomannans (eg guar gum, locust bean gum, tara gum, fenugreek), glucomannans (eg konjac mannan), galacturonates (eg pectins), glucans (eg starches and curdlan), uronates (eg alginate), exopolysaccharides (eg xanthan, gellan), natural gum exudates (eg gum acacia, gum arabic), gelatin and mixtures thereof.

Mixtures of proteins and polysaccharides are preferred as they may interact associatively, disassociatively or synergistically.

The frozen low-fat emulsion of the present invention may comprise between 0 and 30 wt % fat. Preferably the amount of fat is greater than 0.005 wt % but is less than 20 wt % fat, more preferably less than 10 wt % fat, e.g. less than 8 wt %. For example 0.01–10 wt % fat, especially 0.1–8 wt % fat is preferred. In a preferred embodiment, the emulsion comprises from 0.01 wt % fat; more preferably at least 0.5 wt % fat. Within the above ranges the wt % fat may vary according to the particular type of frozen emulsion.

For example in a low-fat ice-cream the wt % fat may be 0 to 8 wt %, preferably 0.1–7 wt %, more preferably 1–6.5 wt %. However in a fat containing water ice or sorbet the wt % fat will typically be within the range eg 0.01% to 4.5%, especially 0.1% to 3 wt %, or e.g. less than 2 wt %.

For the purpose of the present invention, the definition of fat includes liquid oil, crystallising fat blends, e.g. butter fat, and fat mimics such as sucrose polyesters. The oil of fat may be solid or liquid at room temperature. Any suitable edible oil or fat may be used in the formation of the gel particles. Examples include sunflower oil, rapeseed oil and other vegetable or nut oils.

The frozen low-fat emulsion of the present invention may comprise from 0.1 to 60% by volume of gel particles, preferably from 0.2 to 40%, most preferably 0.25–30%, or e.g. 20%. The % by volume of beads in the product will vary according to the wt % of fat or oil in the beads. A higher wt% of fat or oil in the beads requires a lower % by volume of beads in the product to provide the desired wt % in the product.

The gel particles may have a volume average size of from at least 30, preferably at least 50, more preferably at least 100 microns to less than 5000 microns, preferably less than 1000 microns, more preferably less than 500 microns, or e.g. in the range 50–5000 microns, preferably 60–500 microns. Within these ranges, larger particle sizes are preferred. It has been typically found that the larger the gel particle size, the slower the rate of flavour release.

The inventors of the claimed emulsion were surprised to find that the presence of gel particles delays the release of flavour molecules during oral processing; this is surprising because the flavour molecules are of a size suitable for diffusing through the gel matrix of the particles. (It is even more surprising that the freezing of the food product emulsion does not negate or inhibit this effect during oral processing). It is therefore understood that, in the present invention, the gel particles do not encapsulate the flavour molecules in the traditional sense, since the flavour molecules are not trapped within the gel particles.

Without wishing to be bound by theory, the inventors believe that the gel particles act as a static region within the mobile aqueous phase of the emulsion (when eaten the aqueous phase melts in the mouth).

As many important flavour molecules are lipophilic (fat-soluble) they have a preference for solubilising in the oil droplets. The rationale behind this approach is that in o/w emulsions the release of lipophilic flavours occurs in the sequence oil→water→air. It is therefore possible to control the release of lipophillic flavours by creating barriers around the oil droplets which hinder their release into the aqueous phase when the frozen emulsion melts either totally, substantially, or partially during eating. Microstructured emulsions do this by increasing the diffusional pathway and reducing the rate at which lipophillic flavours are released into the aqueous phase.

In accordance with the present invention, there is also provided a process for the preparation of a frozen low-fat food emulsion comprising the steps of:
a) admixing fat and a gel-forming biopolymer to form a first liquid phase;
b) adding the first liquid phase to a second liquid phase which promotes gel formation of the biopolymer to form gel particles having particles of fat located therein;
c) mixing the gel particles with an aqueous phase and fat-soluble flavour molecules to form an aqueous-continuous emulsion; and
d) subjecting the aqueous-continuous emulsion to freezing conditions so that the frozen low-fat emulsion is produced.

Optionally, the first liquid phase is emulsified prior to step (b). In step (b), the first liquid phase may be injected into the second liquid phase. Alternatively, in step (b), the first liquid phase may be sprayed on to the second liquid phase.

The second liquid phase may have a lower temperature than the first liquid phase in order to effect gel formation. Alternatively, the second liquid phase may react with the biopolymer in the first liquid phase in order to effect gel formation.

It is also possible, according to the present invention, to subject the gel particles, and/or aqueous phase, and/or fat-soluble flavour molecules to freezing conditions prior to producing the final frozen emulsion in step (b) above.

The gel particles of the invention may be made by any suitable conventional method.

In one method of preparing the gel particles, an emulsion of agar and/or alginate and oil is injected into a cooled stream of xanthan gum in a low speed mixer; the lower temperature of the xanthan gum promotes gelation of the agar. The resulting gel particles may be used to prepare a low-fat emulsion that is frozen to produce a frozen low-fat emulsion, such as for example a low-fat ice-cream. The size of the particles is determined by the amount of shear.

In another method of preparing the gel particles, an emulsion of sodium alginate and/or agar and oil is co-extruded with air through a nozzle into a bath of calcium chloride solution; the calcium ions react with the alginate to form particles of calcium alginate gel. The size of the gel particles may be determined by the flow rate of the co-extrudate The resulting gel particles may be used as referred to in the preceding paragraph.

In another method of preparing the gel particles an emulsion of sodium alginate is injected into a stream of calcium chloride solution (or calcium chloride and xanthan gum) in a low speed mixer. The size of the particles is determined by the amount of shear. The resulting gel particles may be used as stated above.

In particular an example of forming the gel particles is given in example 1, and is applicable to gel particles to be used in all frozen emulsions of the invention.

The gel particles may in certain circumstances contain up to 60 wt % of oil or fat, preferably 2 to 55 wt %, especially 4 to 40 wt %, e.g. 5 to 35 wt %, or 5 to 30 wt %. However generally 5 to 30 wt % is preferred. For example, good results have been obtained with gel particles containing 5, 10 and 20 wt % fat. However, the level of fat or oil in the beads is not believed to be as important as the total fat -content in the product.

The low-fat emulsions of the present invention may be formed by any suitable method, as long as substantially intact gel particles remain in the final product. In general the process methods known in the art for the traditional full or low-fat products are appropriate. More typically the frozen food emulsion will be formed by conventional methods used for the product concerned. For example low-fat ice-creams may be produced by conventional ice-cream production methods, including those having homogenisation and/or pasteurisation stages. The examples give details of suitable methods of making frozen low-fat emulsions according to the invention for ice-cream and water-ices. However, any suitable known method of preparation may be used, as the method of preparation of the product is not critical. The method of preparation may include an aeration step to produce an aerated product. The process may be a continuous or batch process.

The frozen low-fat emulsions food products of the present invention may be frozen by any suitable method to produce the frozen product. The freezing may for example take place quiescently, e.g. in a blast freezer. Alternatively, the freezing may occur with agitation eg in a scraped surface heat exchanger. Typically the freezing takes place at a temperature of 0° C. to −30° C., for example −5° C. to −20° C. Chapters 11 and 12 of the Arbuckle reference referred to above details known methods. of producing frozen emulsion products which are easily adapted to produce the frozen emulsions of the invention.

The gel particles may be added to the aqueous continuous phase of the food emulsion in any suitable manner and at any suitable time during the process to produce the emulsion. For example, the gel particles may be added to the otherwise completely formulated food product (that may not contain any other fat components) to produce the final food emulsion. Alternatively, the gel particles may be added to the aqueous continuous phase of the emulsion with at least one of the remaining components of the food emulsion added thereafter.

If the food emulsion is to be subjected to an homogenisation process during its preparation, it is preferred the gel particles are added after homogenisation.

If the food emulsion is to be subjected to a pasteurisation process during its preparation, depending upon the material used to form the gel particles, the particles may be added at any stage during the preparation. For example if a low melting point material such as carrageenan or gelatine is used to produce the gel particles, it is preferred if they are added post-pasteurisation.

The temperature of the gel particles when added to the emulsion or at the least one component thereof is not believed to be crucial, e.g. they may be added at a temperature above or below room temperature, i.e. above or below 25° C. However, for economic reasons it is preferred to add the gel particles to the emulsion or its components when the particles and/or emulsion/component(s) are at a temperature below 10° C. Preferably the particles and the emulsion/component(s) are at a temperature at or below 10° C., most preferably at or below 5° C. The particles and/or emulsion/component(s) may be at a temperature below 0° C., eg below −5° C. when the addition occurs. The gel particles and/or emulsion/component(s) may be in a liquid, partially frozen state (ie containing frozen and unfrozen material) or frozen state during the mixing thereof.

It is especially preferred in the manufacture of pasteurised frozen products, eg ice-cream, if the gel particles have a temperature below 10° C., preferably below 5° C. when added to a pasteurised aqueous phase having temperature conveniently below 10° C., but preferably in the range 5° C. to 15° C.

The flavour molecules may be added to the food emulsion in any suitable manner, and at any suitable time during the process. Typically the flavour is added to the aqueous phase of the emulsion, although at least a proportion of the flavour molecules may be in the gel particles when they are added. The latter option is more suitable to those flavour molecules having a low-volatility.

It is preferred if the flavour molecules are added at room temperature or a temperature below room temperature, e.g. at 30° C. or below, preferably 25° C. or below. It is especially preferred if the flavour molecules are added cold, e.g. below 25° C., preferably below 20° C., most preferably below 10° C.

When preparing a frozen low-fat emulsion in accordance with the present invention, flavour components need minimal re-balancing to account for the low phase volume of fat. Also, critical flavours, which are normally fat-soluble and therefore particularly prone to uncontrolled release in low fat emulsions during consumption of the product, are released according to their "full-fat" timescale, thereby improving the perception of their flavour.

The present-invention provides means for controlling the transfer rates, including the rate of release, of flavour molecules in a frozen emulsion, thereby allowing manipulation of the flavour release profile of frozen low-fat food emulsions. Hence, low-fat frozen emulsions can be prepared which have the taste of the equivalent full-fat emulsions during consumption. The present invention achieves this without recourse to an encapsulating coating which must be heated or solubilised in order to release encapsulated flavours.

Examples of the products and processes of the invention will now be described to illustrate by way of example only, but not to limit the invention, with reference to the accompanying figures.

BRIEF DESCRIPTION OF THE DRAWINGS

FIG. 11 is a graph of flavour intensity in area counts (y axis) against time in seconds (x axis) for two water ice compositions containing citral, wherein one of the water-ices contain calcium alginate gel particles.

In the examples that follow delayed flavour release is measured experimentally by MS-Breath analysis which is a technique known in the art.

APcI (Atmospheric Pressure Chemical Ionisation) MS-Breath analysis is a mass spectrometry technique which can be used for the real-time analysis of flavour release during eating. In essence, exhaled air from the nose (during eating of the food product) is sucked into the mass spectrometer where volatiles are generally detected as protonated [M+H]+ ions and provide a temporal intensity profile. The analyses were performed on a Quattro triple quadruple and a Navigator mass spectrometer fitted with an APcI interface. A plot of the time during eating of the product against flavour intensity in the exhaled location is plotted to give the figure plots.

The provision of other examples within the scope of the present invention will be easily within the ability of the skilled person.

EXAMPLE 1

Ethyl Hexanoate Delayed Flavour Release in Non-aerated Ice-cream Formulations

Microstructured emulsions (gel particles) were made by spraying (see below) a stabilised 10% o/w emulsion in 1% Na-alginate (produced as below) into a solution of calcium chloride dihydrate (0.37% w/w) to form a gelled alginate emulsion. Calcium alginate gelled beadlets are rapidly formed and were allowed to equilibrate for at least 1 hour before being harvested with a sieve, ready for use.

The stabilised o/w emulsions used above consisted of the following ingredients by weight; 20, 10 or 5 wt % sunflower oil, 0.5%. Tween 60 polyoxyethylene sorbitan monstearate, 1% Na alginate (Manugel) and water to 100%. The water was heated to 80° C. and the alginate and emulsifier were dissolved therein by mixing on a Silverson (high shear) mixer for 10 minutes. The mixed solution was homogenised using a Crepaco homogeniser at 100 bar to produce a fine emulsion with ca. 2–3 μm diameter oil droplets. The resultant emulsion was cooled to 5° C. and acidified to pH 3.8 (for storage). One run to form each of the different %wt of oil in the gel-particles was undertaken. (i.e. one run for each preparation of the emulsions containing 20 wt % oil, 10 wt % oil and 5 wt % oil respectively).

The spraying, as above, was done using either a syringe or a pneumatic atomising nozzle connected to a peristaltic pump with which the particle size was primarily controlled by the blow-off stream of air. Particles of calcium alginate gel approximately 1 μm in diameter and containing droplets of sunflower oil at the wt % as above were formed.

Figure 1:
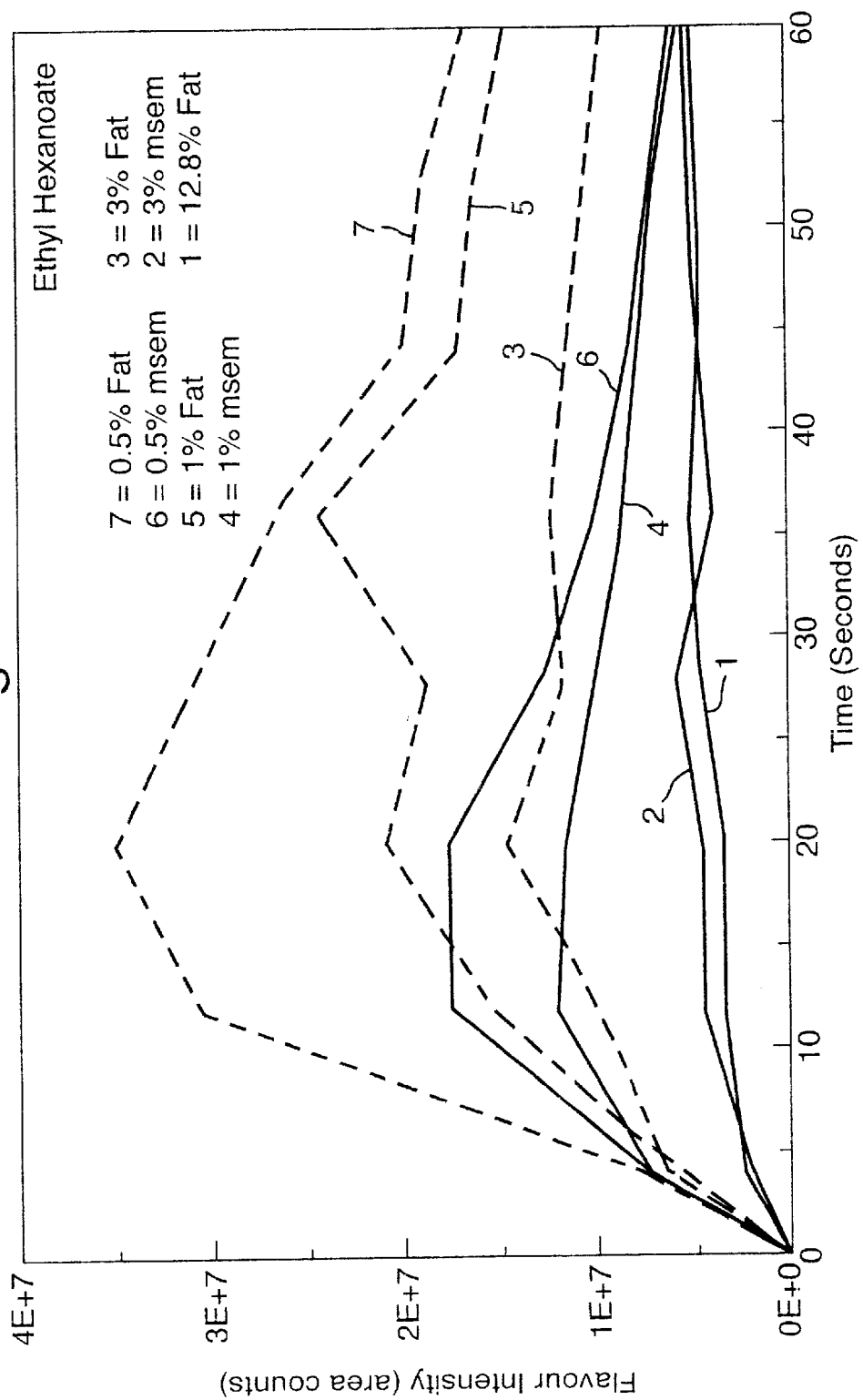
FIG. 1 is a graph of flavour intensity in area counts (y axis) against time in seconds (x axis) for seven non-aerated ice-creams containing ethyl hexanoate, wherein three of the ice-creams contain calcium alginate gel particles.

FIG. 1 refers to msem (microstructured emulsions) which are the gel particles of the invention.

An ice cream formulation was prepared omitting fat components from the formulation. The ice-cream was prepared to the formulation as below.

|  | wt % | |
| --- | --- | --- |
|  | 0.5% and 1.0% oil samples | 3% oil samples |
| Skimmed milk powder | 10.0 | 10.0 |
| Whey | 4.0 | 4.0 |
| Sucrose | 14.0 | 14.0 |
| Glucose solids | 5.0 | 5.0 |
| Sodium alginate | 0.3 | 0.3 |
| Calcium alginate particles | 10.0% | 15% |
| Water | balance to 100% | balance to 100% |

*particles prepared as above, for 0.5 wt % and 1.0 wt % oil samples the oil content in the gel particles was 5 wt % and 10 wt % respectively. For the 3% oil samples the oil content in the gel particles was 20 wt %.

Sodium alginate and the sugars were blended and added to the water which was at 65° C. The mixture was warmed to 70° C. and the milk powder/whey was added with stirring (Silversen high shear mixer). The calcium alginate particles were added to the mixture with stirring, and pasteurised at 83° C. for 30 seconds before being cooled to 5° C. 50 ml samples were poured into a series of 100 ml glass sample jars fitted with self-sealing lids.

The flavour ethyl hexanoate was added in a flavour cocktail (which also contained nonanone, hexanone and butanone) to the glass sample bottles through the self-sealing lid. The flavour/ice-cream pre-mix/calcium alginate particle mixture was allowed to equilibrate for 18 hours at approximately 5° C.

After the equilibration time the sample was frozen for at least four hours in a blast freezer at −35° C. After freezing 2ml samples of the frozen product were taken for Mass Spectrometry Breath Analysis (MS Breath Analysis). The samples were stored at −20° C. to −25° C. before being tested by trained analysts as detailed above. Before analysis occurred the samples were stored at approximately −18° C.

The concentration of each flavour in the final product was approximately 5 ppm. 1 μm of the flavour cocktail was added to each 100 ml glass jar.

A flavour intensity over time profile for the low-fat ice-creams containing the gel particles was plotted by passing the exhaled breath of a consumer of the ice-cream into a mass spectrometer. The resulting profiles are shown in lines 2, 4 and 6 of FIG. 1.

1.2 A series of traditional low-fat ice-creams were prepared following the method above, but replacing the calcium alginate particles with sunflower oil and accordingly adjusting the water content to give oil levels of 0.5 wt %, 1 wt % or 3 wt %. The same flavour cocktail containing ethyl hexanoate was added to the non-aerated ice-cream samples which were left as above to equilibrate in a sealed bottle.

A flavour intensity over time profile was plotted; lines 3, 5 and 7 of FIG. 1 are the resulting profiles.

1.3 A traditional full-fat non-aerated ice-cream was prepared following the method above and using sunflower oil with the water content adjusted to give a fat level of 12.8 wt %. The flavour cocktail containing ethyl hexanoate was added to the non-aerated ice-cream, and the samples were left as above to equilibrate in a sealed bottle.

A flavour intensity over time profile was plotted; line 1 of FIG. 1 is the resulting profile.

Results

From lines 3, 5 and 7 of FIG. 1 it can be seen that in the traditional low-fat ice-creams, with no particles of calcium alginate gel present, the flavour ethyl hexanoate is rapidly released, resulting in a very high peak of flavour intensity in the early stages of oral processing. Rapid dissipation of the flavour intensity follows.

From line 1 it can be seen that the full-fat non-aerated ice-cream exhibits a more gradual build up of flavour to a lower peak of flavour intensity; the flavour also dissipates more slowly.

From lines 2, 4 and 6 it can be seen that the low-fat non-aerated ice-creams of the present invention have a flavour release profile which is more similar to that of the full-fat ice-cream than ii that of the traditional low-fat ice-cream.

For a given %wt fat in the non-aerated ice-cream a lower flavour intensity count profile is obtained when the oil is present in the gel. particles than when the same %wt fat is present in the conventional manner. This can be seen by comparing lines 2 with 3 or 4 with 5 or 6 with 7.

EXAMPLE 2

Nonanone Delayed Flavour Release in Non-aerated Ice-cream Formulations

Figure 2:
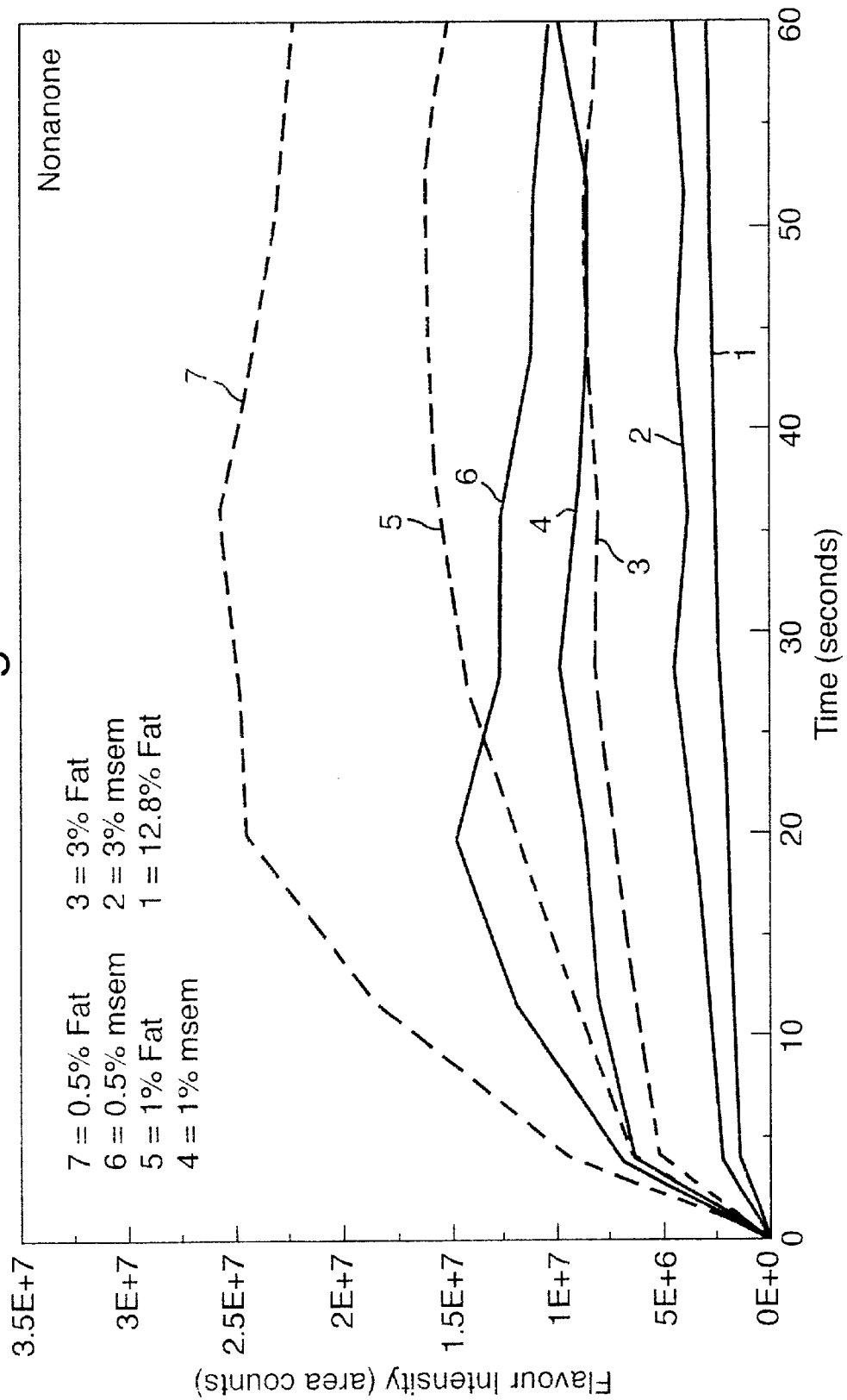
FIG. 2 is a graph of flavour intensity in area counts (y axis) against time in seconds (x axis) for seven non-aerated ice-creams containing nonanone, wherein three of the ice-creams contain calcium alginate gel particles.

The analysis of example 1 was repeated for the flavour nonanone. In FIG. 2, which shows the flavour intensity over time profiles, lines 2, 4 and 6 refer to the low-fat non-aerated ice-creams of the present invention, lines 3, 5 and 7 refer to the traditional low-fat non-aerated ice-cream, and line 1 refers to the traditional full-fat non-aerated ice-cream. Again msem on FIG. 2 refers to the gel particles of the invention.

Results

From lines 3, 5 and 7 it can be seen that in the traditional low-fat non-aerated ice-cream, with no particles of calcium alginate gel present, the flavour nonanone is more rapidly released, resulting in a very high peak of flavour intensity in the early stages of oral processing. Rapid dissipation of the flavour intensity follows especially for the lower fat levels (0.5% and 1% fat).

From line 1 it can be seen that the traditional full-fat non-aerated ice-cream exhibits a more gradual build up of flavour to a lower peak of flavour intensity; the flavour also dissipates more slowly.

From lines 2, 4 and 6 it can be seen that the low-fat non-aerated ice-creams of the present invention have a flavour release profile which is more comparable to that of the full-fat non-aerated ice-cream than in. the release profile of the equivalent traditional low-fat ice-cream. For a given %wt fat in the non-aerated ice-cream a lower flavour intensity count profile is obtained when the oil is present in the gel particles than when the same %wt fat is present in the conventional manner. This can be seen by comparing lines 2 with 3 or 4 with 5 or 6 with 7.

EXAMPLE 3

Heptanone Delayed Flavour Release in Non-aerated Ice-cream Formulations

Figure 3:
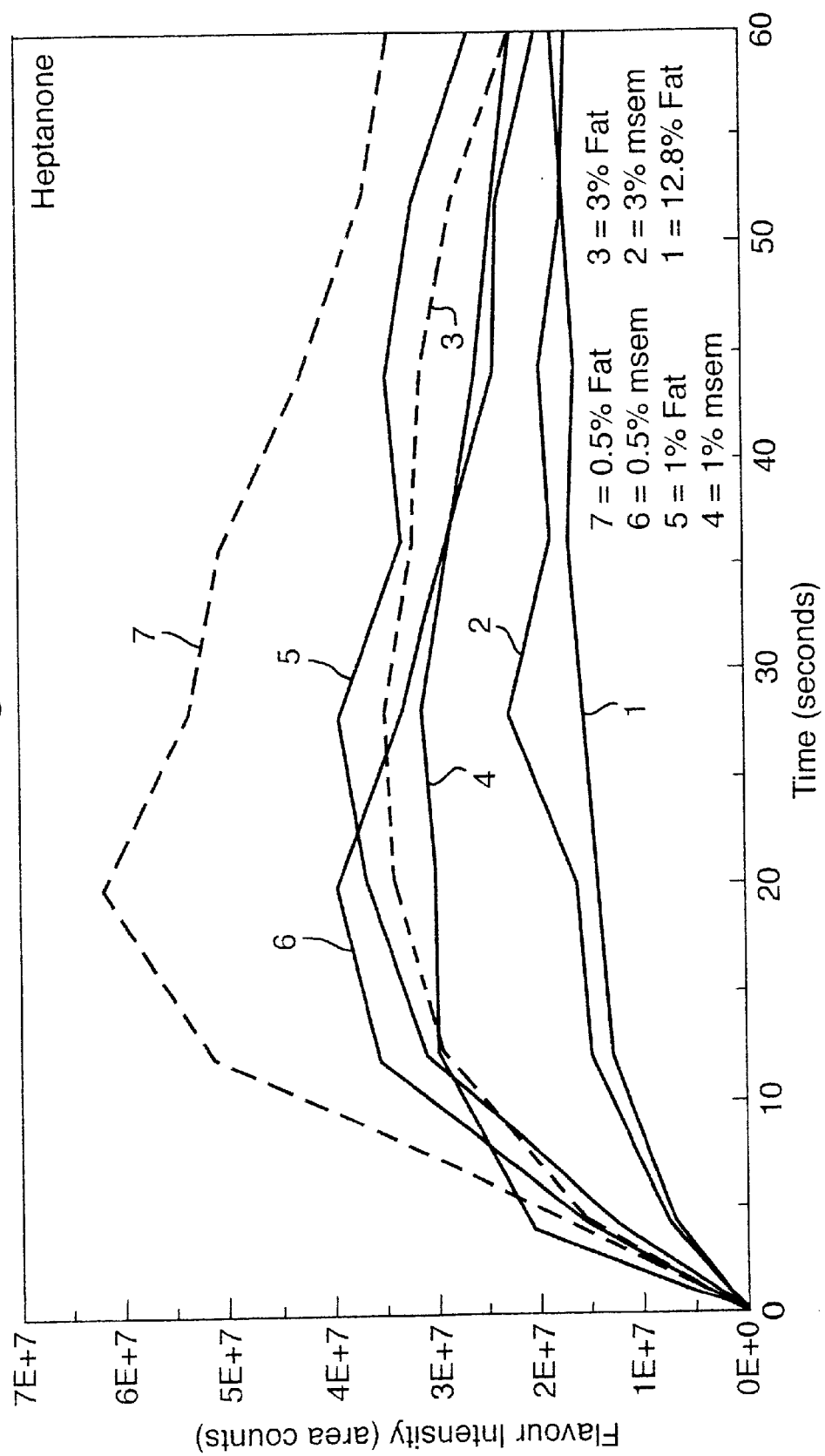
FIG. 3 is a graph of flavour intensity in area counts (y axis) against time in seconds (x axis) for seven non-aerated ice-creams containing heptanone wherein three of the ice-creams contain calcium aginate gel particles.

The analysis of example 1 was repeated for the flavour heptanone. In FIG. 3, which shows the flavour intensity over time profiles; lines 2, 4 and 6 refer to the low-fat non-aerated ice-cream of the present invention, lines 3, 5 and 7 refer to the traditional low-fat non-aerated ice-cream and line 1 refers to the traditional full-fat non-aerated ice-cream.

Again msem on FIG. 3 refers to the gel particles of the invention.

Results

From lines 3, 5 and 7 it can be seen that in the traditional low-fat non-aerated ice-cream, with no particles of calcium alginate gel present, the flavour molecules of heptanone is more rapidly released than in the equivalent oil content examples of the invention (see lines 2, 4 and 6), resulting in a very high peak of flavour intensity in the early stages of oral processing. Rapid dissipation of the flavour intensity follows.

From line 1 it can be seen that the full-fat non-aerated ice-cream exhibits a more gradual build up of flavour to a lower peak of flavour intensity; the flavour also dissipates more slowly.

From lines 2, 4 and 6 it can be seen that the low-fat non-aerated ice-creams of the present invention have a flavour release profile which is more comparable with that of the full-fat ice-cream than is the release profile of the equivalent traditional low-fat ice-cream.

It is noted that for a given %wt fat in the non-aerated ice-cream, a lower flavour intensity count profile is obtained when the oil is present in the gel particles than when the same % wt fat is present in the conventional manner. This can be seen by comparing lines 2 with 3 or 4 with 5 or 6 with 7.

EXAMPLE 4

Butanone Flavour Release in Non-aerated Ice-cream Formulations

Figure 4:
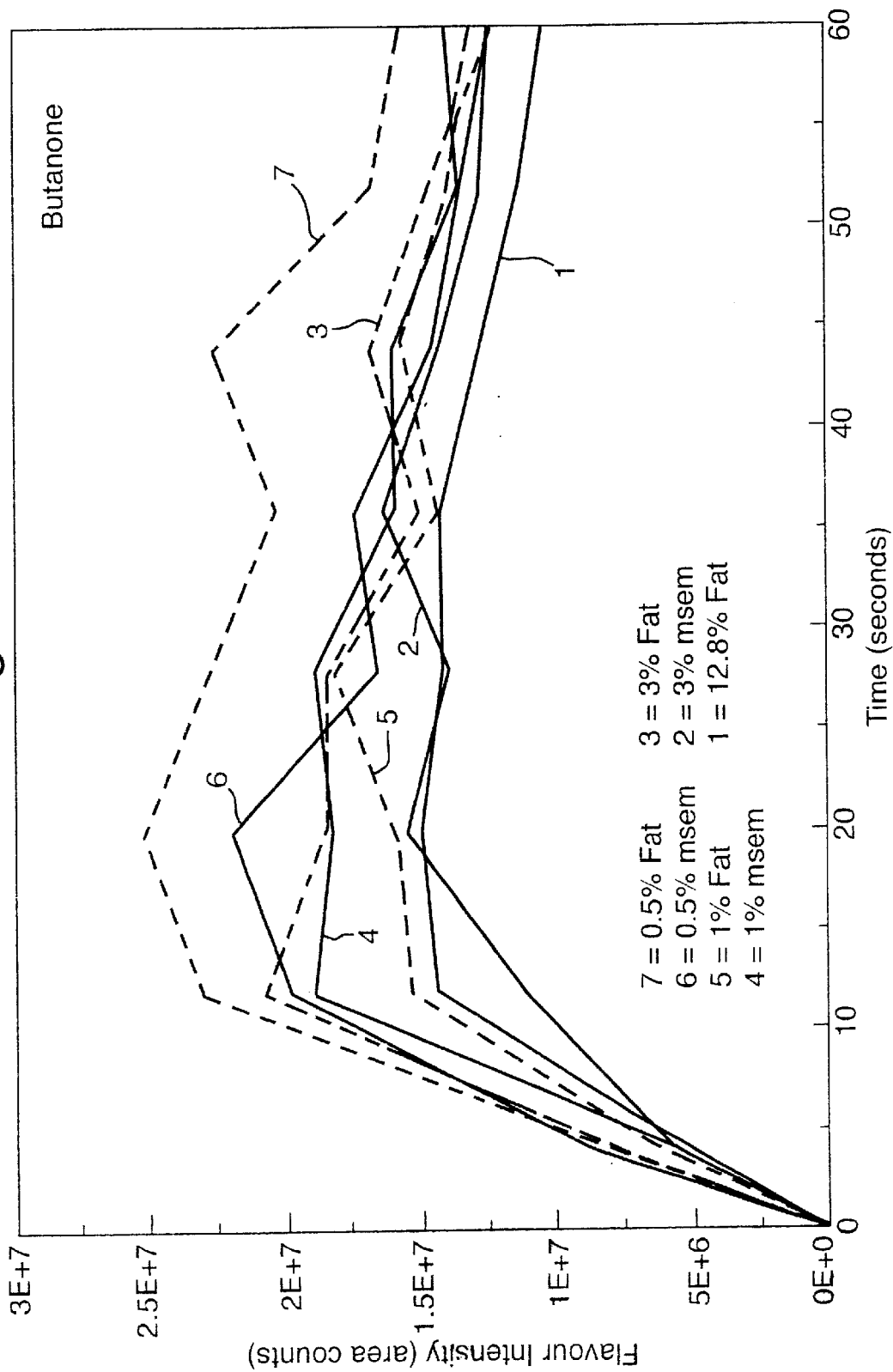
FIG. 4 is a graph of flavour intensity in area counts (y axis) against time in seconds (x axis) for seven non-aerated ice-creams containing butanone wherein three of the ice-creams contain calcium alginate gel particles.

The analysis of example 1 was repeated for the flavour butanone. In FIG. 4, which shows the flavour intensity over time profiles; lines 2,4 and 6 refer to the low-fat non-aerated ice-cream of the present invention, lines 3, 5 and 7 refer to the traditional low-fat non-aerated ice-cream, and line 1 refers to the traditional full-fat non-aerated cream. Again mesm on FIG. 4 refers to the gel particles of the invention.

Results

From line 1 it can be seen that the full-fat non-aerated ice-cream exhibits a more gradual build up of flavour to a lower peak of flavour intensity; the flavour also dissipates slowly than for any of the other ice-cream examples.

From FIG. 4 it can be seen that the fat concentration in the ice-creams has little effect on the flavour release profile of butanone, since it is a flavour that has a significant water-soluble character, in other words it does not have a highly lipophilic character. Consequently the presence or absence of the gel particles of the present invention has a much reduced effect on the release of butanone when compared to ethyl hexanoate and nonanone, which are more lipophilic flavours. This demonstrates the present invention can selectively control the release of flavours having a predominantly lipophilic character.

EXAMPLE 5

Ethyl Hexanoate Delayed Flavour Release in Aerated Ice-creams

Three ice-cream examples were made up following the ice-cream formulation and basic preparation method for example 1. The examples contained the amount of fat, and in the form, as given below;

a) 12.8 wt % sunflower oil (SFO) -traditional full fat ice-cream
b) 1 wt % SFO—traditional low fat ice-cream
c) 10 wt % gel particles (msem) to give 1 wt % total oil from the gel particles low fat ice-cream of the invention.

In all cases the ice-cream formulation was made to 100 wt % by adjusting the water content. The gel particles were produced as for Example 1 and had an oil content of 10 wt % sunflower oil.

5 kg of ice-cream pre-mix was prepared, and to 1 kg thereof the gel particles (500 g) or the oil was added. A flavour cocktail as for example 1 containing ethyl hexanoate was also added, and those samples were allowed to equilibrate for 18 hours at approximately 5° C.

After 18 hours, the equilibrated mixture was added to 3.5 kg of the remaining pre-mix. The flavoured 5 kg of ice-cream incorporating the added gel particles (or oil for (a) and (b)) was allowed to equilibrate at a temperature of approximately 5° C. before processing.

The processing to produce the aerated ice-cream was carried out using a continuous 'Hoyer MF50' freezer with an exit temperature of −6.5° C. and an overrun of 100%. The mix flow rate was 0.2 L/min and the dasher speed in the freezer was 400 rpm. The resultant aerated ice-cream was then frozen for 2 hours at −35° C. in a blast freezer and then stored at −25°C.

2 ml samples were taken as in Example 1 and MS-breath analysis carried out as before. A flavour intensity over time profile was plotted for each sample a-c above.

Figure 5:
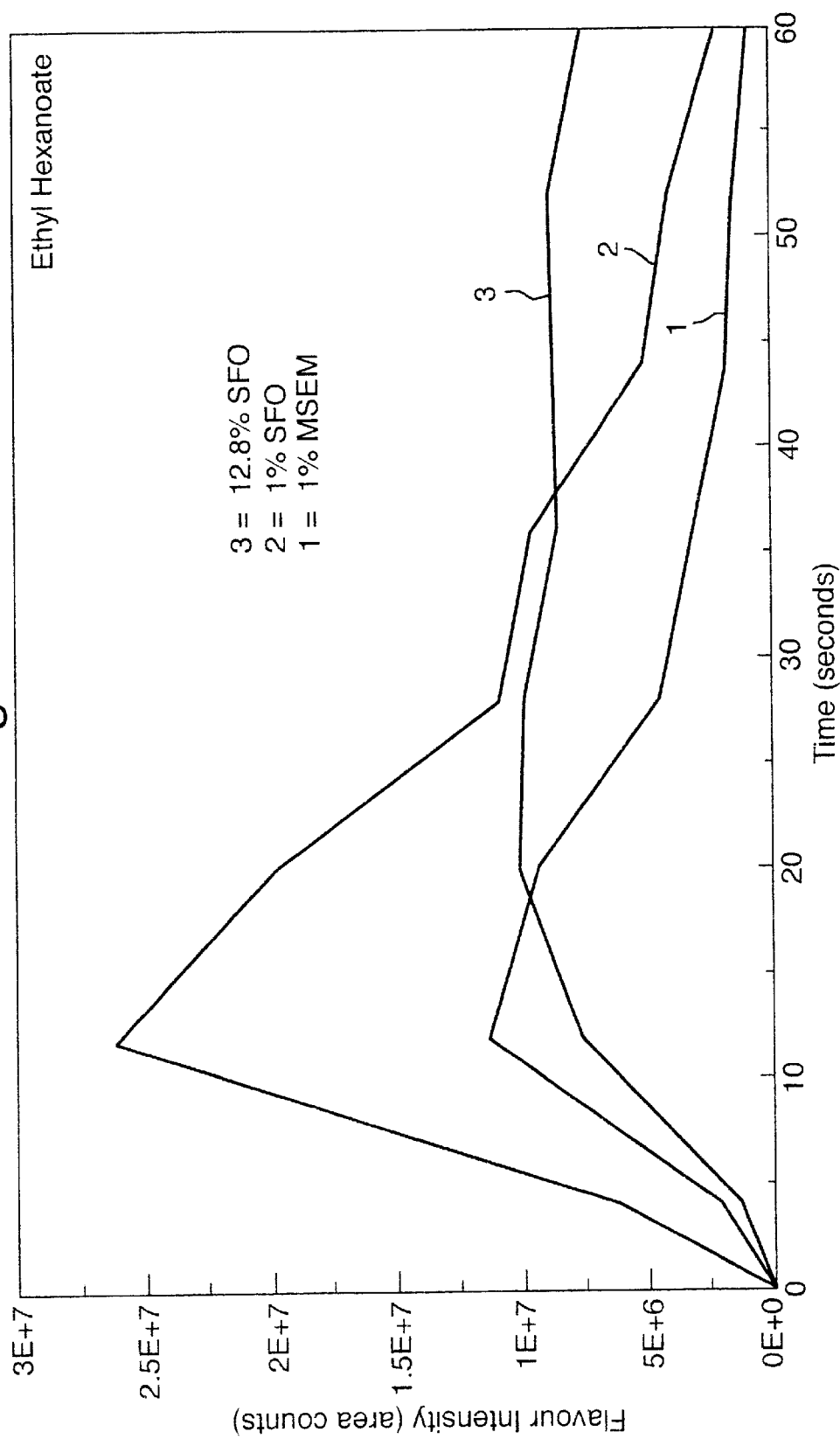
FIG. 5 is a graph of flavour intensity in area counts (y axis) against time in seconds (x axis) for three aerated ice-creams containing ethyl hexanoate, wherein one of the ice-creams contains calcium alginate gel particles.

The results of the MS-breath analysis are given in FIG. 5 as a flavour intensity over time profile plot. Line 1 is for the ice-cream of the present invention, lines 2 or 3 are for the 1 wt % or 12.8 wt % fat ice-creams respectively.

Results

From line 2 of FIG. 5 it can be seen that in the traditional low-fat ice-cream, with no particles of calcium alginate gel present, the flavour ethyl hexanoate is rapidly released, resulting in a very high peak of flavour intensity in the early stages of oral processing. Rapid dissipation of the flavour intensity follows.

From line 3 it can be seen that the full-fat aerated ice-cream exhibits a more gradual build up of flavour to a lower peak of flavour intensity; the flavour also dissipates more slowly.

From line 1 it can be seen that the low-fat aerated ice-cream of the present invention has a flavour release profile intensity which is more similar to that of the full-fat ice-cream than is that of the traditional low-fat ice-cream.

EXAMPLE 6

Nonanone Delayed Flavour Release in Aerated Ice-cream Formulations

The analysis of Example 5 was repeated for the flavour nonanone rather than ethyl hexanoate.

Figure 6:
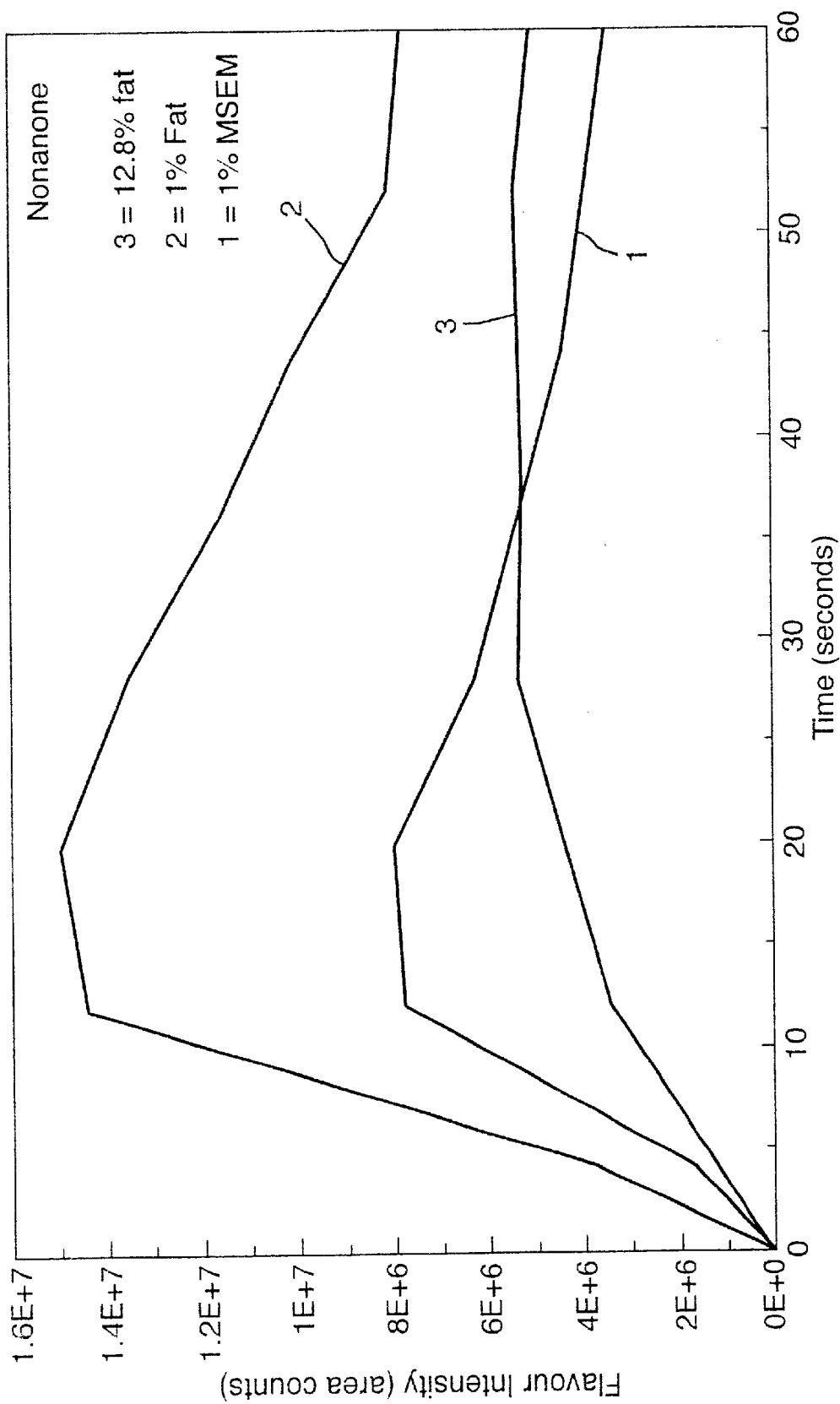
FIG. 6 is a graph of flavour intensity in area counts (y axis) against time in seconds (x axis) for three aerated ice-creams containing nonanone, wherein one of the ice-creams contain calcium alginate gel particles.

In FIG. 6, which shows the flavour intensity over time profiles, line 1 refers to the low-fat aerated ice-cream of the present invention, line 2 refers to the traditional low-fat aerated ice-cream and line 3 refers to the traditional full fat aerated ice-cream.

Again msem on FIG. 6 refers to the gel particles of the invention.

Results

From line 2 of FIG. 6 it can be seen that in the traditional low-fat aerated ice-creams with no particles of calcium alginate gel present, the flavour ethyl hexanoate is rapidly released, resulting in a very high peak of flavour intensity in the early stages of oral processing. Rapid dissipation of the flavour intensity follows.

From line 3 it can be seen that the full-fat aerated ice-cream exhibits a more gradual build up of flavour to a lower peak of flavour intensity; the flavour also dissipates more slowly.

From line 1 it can be seen that the low-fat aerated ice-cream of the present invention has a flavour release profile intensity which is more similar to that of the full-fat aerated ice-cream than is that of the traditional low-fat aerated ice-cream.

Therefore Examples 5 and 6 demonstrate that a delayed flavour release effect is also obtained by the present invention in an aerated ice-cream.

EXAMPLE 7

Importance of Fat Containing Particles for Ethyl Flavour Molecules Hexanoate

Two control ice-cream pre-mix formulations containing cream as the fat were prepared as below; a) is a traditional full-fat ice-cream containing 12.8 wt % fat and b) is a traditional low-fat ice-cream containing 0.5 wt % fat. A further example c) contained 0.5 wt % fat and empty gel particles. An example as according to the invention d) contained 0.5 wt % fat added by gel the addition of particles.

|  | wt % | | | |
| --- | --- | --- | --- | --- |
|  | a | b | c | d |
| Sucrose | 16.00 | 16.00 | 16.00 | 16.00 |
| Skimmed milk powder | 9.25 | 10.43 | 10.48 | 10.48 |
| Xanthan Gum | 0.75 | 0.75 | 0.75 | 0.75 |
| Cream (48% fat) | 26.47 | 0.82 | — | — |
| Water | 48.28 | 72.75 | 67.27 | 67.77 |
| Sunflower oil | — | — | 0.5 | — |
| 'Empty' gel particles | — | — | 5.0 | — |
| Gel particles *10 | — | — | — | 5.0 |

*10 wt % sunflower oil

The four ice-cream formulations were prepared following the method described in example 1. The gel particles were prepared as for example 1. To each of the prepared samples the flavour cocktail comprising ethyl hexanoate, nonanone, heptanone and deuterated acetone was added as below.

All samples (a) to (d) were quiescently frozen at −18° C. to produce unaerated ice-creams, which were consumed by trained analysts, and the flavour intensity over time profile for each ice-cream plotted by MS-breath analysis.

Figure 7:
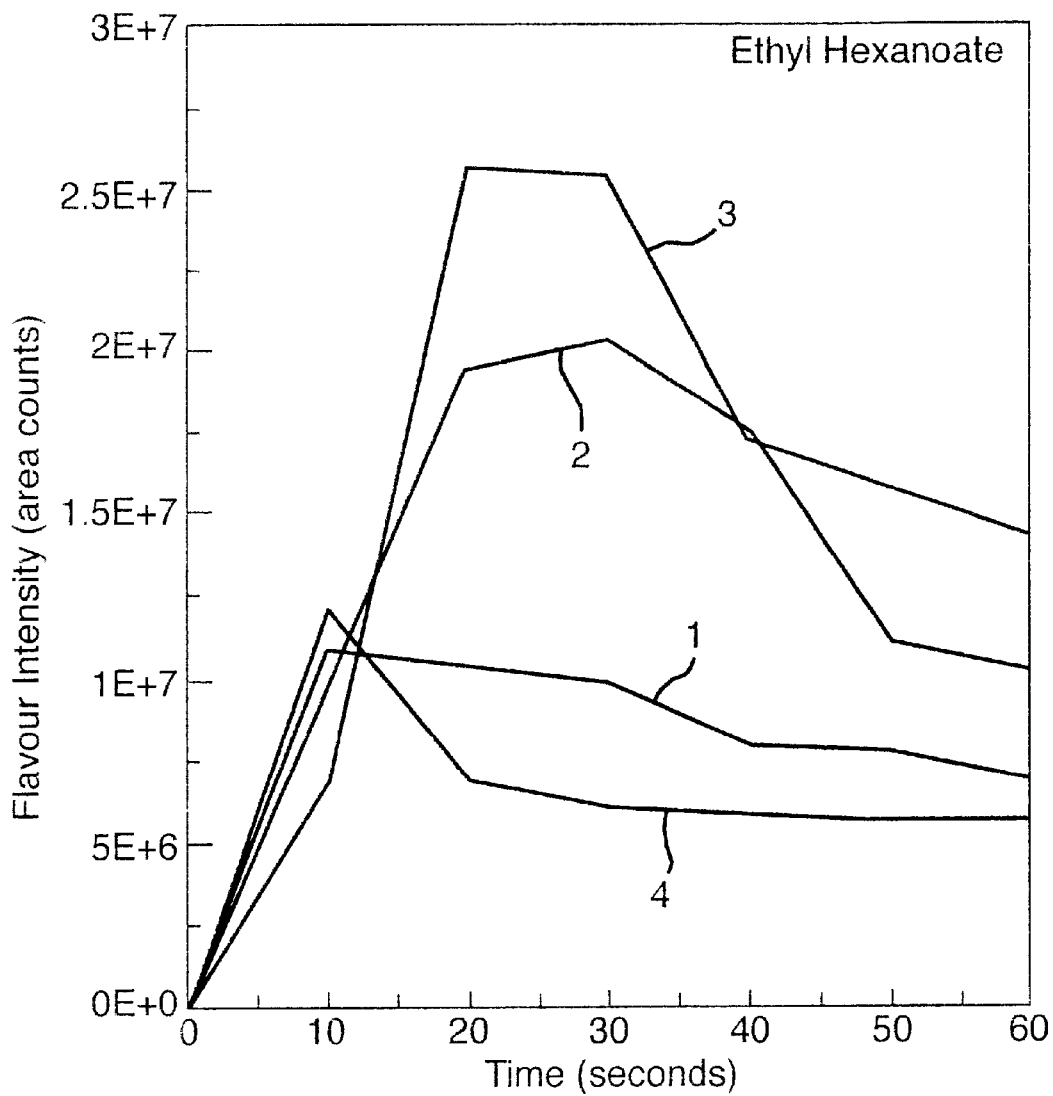
FIG. 7 is a graph of flavour intensity in area counts (y axis) against time in seconds (x axis) for four non-aerated ice-creams containing ethyl hexanoate, wherein one of the ice-creams contains calcium alginate gel particles and one contains 'empty' calcium alginate gel particles.

FIG. 7 shows the resulting profiles where;
line 1 represents sample (d) (low-fat ice-cream of the invention);
line 2 represents sample (c) (low-fat ice-cream, empty gel particles);
line 3 represents sample (b) above (traditional low-fat ice-cream); and
line 4 represents sample (a) above (traditional full-fat ice-cream).

Results

As for the previous examples it can be seen that in the traditional low-fat non-aerated ice-cream (line 3) with no particles of calcium alginate present, the flavour ethyl hexanoate is very rapidly released, resulting in a very high peak of flavour intensity in the early stages of oral processing. Rapid dissipation of the flavour intensity follows.

From line 4 it can be seen that the traditional full fat non-aerated ice-cream exhibits a more gradual build up of flavour to a lower peak of flavour intensity, and the flavour dissipates more slowly.

From line 1 it can be seen the low-fat non-aerated ice-cream of the invention has a flavour release profile very similar in initial intensity, and in changing intensity with time, to that of the traditional full-fat product.

Furthermore, from line 2 it can be seen that the ice-cream containing 0.5 wt % fat and 'empty' gel particles has a flavour release profile very similar to that of the traditional low-fat ice-cream (line 3). This demonstrates that the fat needs to be located at least predominantly within the gel particles for the delayed flavour release to be obtained.

EXAMPLE 8

Importance of Fat-containing Particles for Nonanone Flavour Molecules

Figure 8:
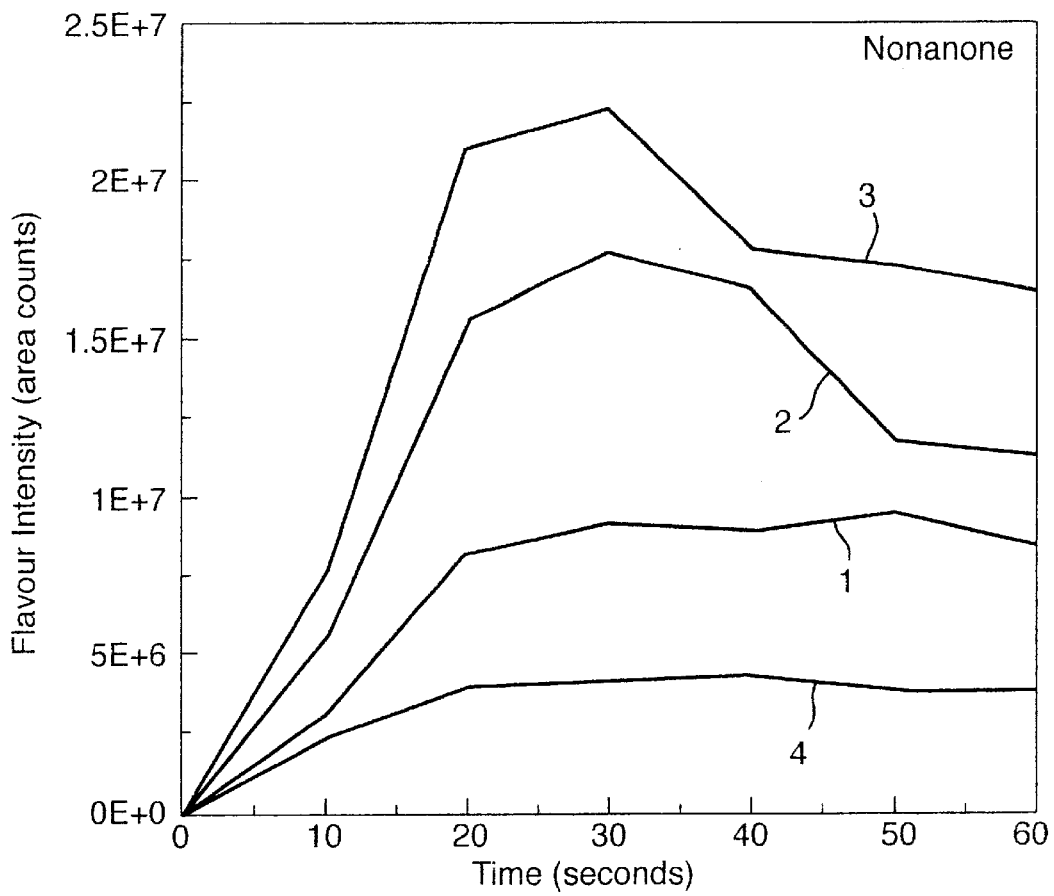
FIG. 8 is a graph of flavour intensity in area counts (y axis) against time in seconds (x axis) for four non-aerated ice-creams containing nonanone, wherein one of the ice-creams contains calcium alginate gel particles and one contains 'empty' calcium alginate gel particles.

The analysis of example 7 was repeated using nonanone as the flavour. The flavour release profiles are given in FIG. 8 where:
Line 1 represents the low-fat ice-cream of the invention containing 0.5 wt % fat (sunflower oil) added as gel particles;
Line 2 represents a low-fat ice-cream containing 0.5 wt % fat with empty gel particles added;
Line 3 represents a traditional low-fat ice-cream containing 0.5 wt % fat; and
Line 4 represents the traditional full-fat ice-cream containing 12.8 wt % fat.

Results

Lines 4 and 3 have the same type of flavour intensity profile as is demonstrated in FIG. 7. The flavour-intensity profile for the low-fat ice-cream of the present invention, line 1, demonstrates a lower initial intensity and a lower profile with time than where the equivalent fat content is outside the gel particles (line 2).

The nonanone delayed flavour release effect also requires the fat to be present, at,least predominantly, in the gel particles.

EXAMPLE 9

Importance of the Fat-containing Particles for Heptanone Flavour Molecules

Figure 9:
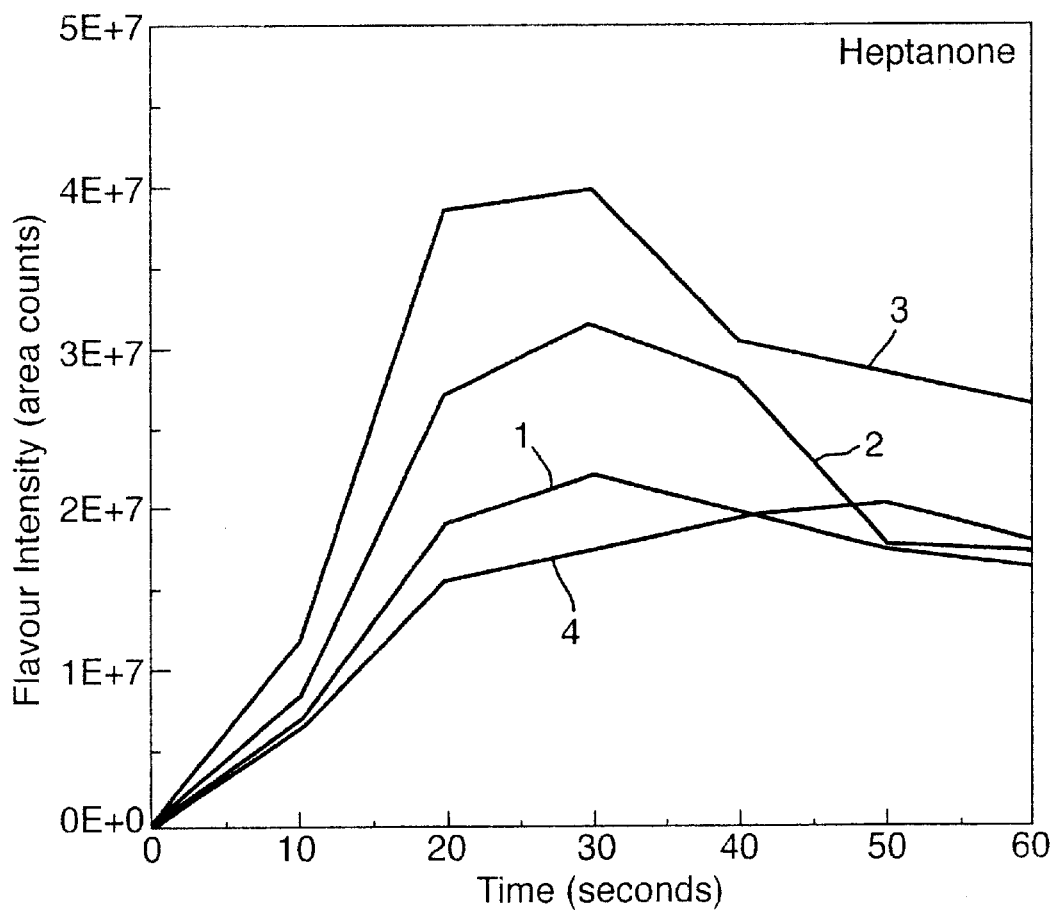
FIG. 9 is a graph of flavour intensity in area counts (y axis) against time in seconds (x axis) for four non-aerated ice-creams containing heptanone wherein one of the ice-cream contains calcium alginate particles and one contains 'empty' calcium alginate gel particles.

The analysis of Example 7 was repeated for the flavour heptanone and the flavour release profiles plotted as before. The results are given in FIG. 9 with lines 1 to 4 representing the same samples as in Example 8, but with nonanone being the flavour.

Results

Again the results demonstrate that the low-fat ice-cream of the invention and the traditional full-fat ice-cream have similar flavour intensity profiles (lines 1 and 4). If a low fat level is present outside the gel particles, the delayed release effect is not obtained in the same manner (compare lines 1 and 4 with lines 2 and 3).

EXAMPLE 10

Fat-containing Particles for Acetone Flavour Molecule

The analysis of Example 7 was repeated for the flavour acetone and the flavour release profiles plotted as before. The results are given in FIG. 10 with lines 1 to 4 representing the same samples as in Example 8, but with acetone rather than nonanone being the flavour. Acetone was used and tested as deuterated acetone.

Results

Figure 10:
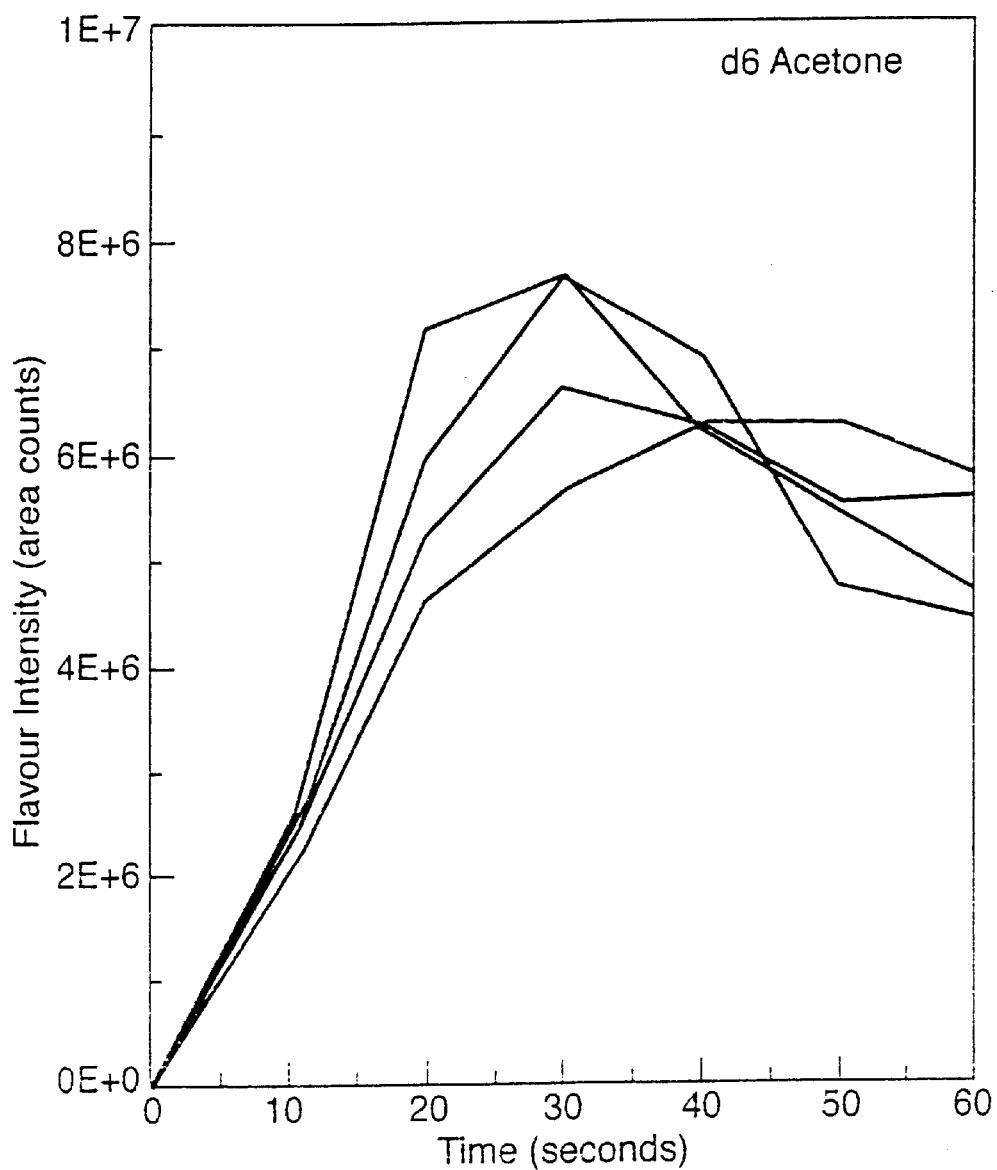
FIG. 10 is a graph of flavour intensity in area counts (y axis) against time in seconds (x axis) for seven non-aerated ice-creams containing acetone wherein three of the ice-creams contain calcium alginate gel particles and one contains 'empty' calcium alginate gel particles.

From FIG. 10 it can be seen that the fat concentration in the ice-creams has little effect on the flavour release profile of deuterated acetone since it is a flavour that has a significant water-soluble characte; in other words it does not have a highly lipophilic character. Consequently, the presence or absence of the gel particles of the present invention has a much reduced effect on the release of butanone when compared to ethyl hexanoate and nonanone, which are more lipophilic flavours. This demonstrates the present invention can selectively control the release of flavours having a predominantly lipophilic character.

EXAMPLE 11

Delayed Flavour Release from a Water Ice-composition

The delayed flavour release of the flavour citral from a water-ice is demonstrated in FIG. 11, where line 1 represents the flavour intensity profile of a water-ice according to the invention,. and line 2 represents the flavour release profile of a conventional water ice.

A water-ice base formulation was prepared as below:

|  | wt % |
| --- | --- |
| Dextrose | 4.5 |
| Sucrose | 16 |
| LBG | 0.25 |
| Citral lemon flavour | 0.001 |
| Colour | 0.0075 |
| Water | to balance |

*LBG = Locust Bean Gum

The above ingredients were mixed together and pasteurised at 83° C. The solution was mixed and cooled leaving the mixer at −4° C. followed by blast freezing at −35° C. The samples were cold stored at −25° C.

A sample of the water ice with citral flavour was taken as previously and tested for delayed flavour release as above. FIG. 11 shows the plot of the flavour release profile for the traditional water ice in line 2. The flavour intensity is seen to reach a very high peak at about 20 to 30 seconds, and dissipates quickly.

A low-fat water-ice comprising gel particles, as according to the present invention, was prepared following the above formulation. Sodium alginate gel particles were prepared as for example 1 containing 1% sunflower oil with the gel particles being prepared from a solution, containing 100 ppm citral flavour. The final product therefor contained citral flavour in the gel particles.

The water-ice solution was produced as above leaving the mixing apparatus as a slush at −4° C. exit temperature. 10 wt % of gel particles were added by stirring to weighed samples of water ice slush after exit from the mixer. The water ice containing the gel particles was blast frozen at −35° C. The water ice as according the invention was tested for delayed flavour release properties by MS-breath analysis as above. FIG. 11 line 1 shows the flavour release profile which demonstrates delayed, sustained flavour release of the citral flavour.

Results

From a comparison of lines 1 and 2 on FIG. 11 it is shown the water ice of the present invention provides an initially much less intense release of the citral flavour than the conventional water-ice. This lower release intensity is sustained throughout the profile.

The conventional water-ice however demonstrates no delayed release of the citral flavour molecule.

Summary

On the basis of the above examples it is evident that, in the present invention, the rate of release of fat-soluble flavours during consumption of the frozen food emulsions is delayed by creating a microstructure in which a low phase volume of oil droplets is trapped within a biopolymer gel, and flavour molecules are either solubilised in the oil droplets or diffusing through the gel particles. The result is that the flavour perception profile of a full-fat frozen emulsion is created for a low-fat frozen emulsion resulting the flavour profiles being very similar.

What is claimed is:

1. A frozen low-fat food emulsion comprising a continuous aqueous phase and a dispersed phase which comprises fat particles, gel particles and fat-soluble flavour molecules, wherein substantially all of the fat particles are located within the gel particles, and wherein at least 35% of the flavour molecules are located in a plurality of the gel particles to thereby delay the rate of release of the flavour molecules from the frozen emulsion.

2. A frozen emulsion as claimed in claim 1 wherein at least 50% of the flavour molecules are located in a plurality of the gel particles.

3. A frozen emulsion as claimed in claim 1 wherein the gel particles are prepared from food-grade gelling biopolymers selected from proteins, galactans, galactomannans, glucomannans, galacturonates, glucans, uronates, exopolysaccharides, natural gum exudates, gelatin and mixtures thereof.

4. A frozen emulsion as claimed in claim 3, wherein the gel particles are prepared from food-grade gelling biopolymers selected from casein agar, iota-carrageenan, kappa-carrageenan, furcelleran, guar gum, locust bean gum, tara gum, fenugreek, konjac mannan, pectin, alginate, xanthan, gellan, gum acacia, gum arabic and mixtures thereof.

5. The frozen emulsion as claimed in claim 1 comprising greater than 0.005% and up to 30% wt % fat.

6. A frozen emulsion as claimed in claim 5 comprising 0.01 to 10 wt % fat.

7. A frozen emulsion as claimed in claim 6 comprising 0.1 to 8 wt % fat.

8. A frozen emulsion as claimed in claim 1 comprising from 0.1 to 60.0% by volume of gel particles.

9. A frozen emulsion as claimed in claim 8 comprising from 0.2 to 40.0% by volume of gel particles.

10. A frozen emulsion as claimed in claim 9 comprising from 0.25 to 30% by volume of gel particles.

11. A frozen emulsion as claimed in claim 1 wherein the gel particles have a volume average size of from 50 to 5000 microns.

12. A frozen emulsion as claimed in claim 11 wherein the gel particles have a volume average size of from 60 to 500 microns.

13. A frozen emulsion according to claim 1 wherein the emulsion is aerated and has an overrun of 5–200%.

14. A frozen emulsion according to claim 13 wherein the overrun is from 10–150%.

15. A composite food product comprising the frozen food emulsion of claim 1.

* * * * *